US008106749B2

(12) United States Patent
Ina et al.

(10) Patent No.: US 8,106,749 B2
(45) Date of Patent: Jan. 31, 2012

(54) TOUCHLESS CONTROL OF A CONTROL DEVICE

(75) Inventors: Peter Joseph Ina, Cary, NC (US); William O. Camp, Jr., Chapel Hill, NC (US)

(73) Assignee: Sony Ericsson MObile Communications AB, Lund (SE)

( * ) Notice: Subject to any disclaimer, the term of this patent is extended or adjusted under 35 U.S.C. 154(b) by 793 days.

(21) Appl. No.: 12/172,487

(22) Filed: Jul. 14, 2008

(65) Prior Publication Data

US 2010/0007511 A1 Jan. 14, 2010

(51) Int. Cl.
*G05B 11/01* (2006.01)
*G08C 19/16* (2006.01)

(52) U.S. Cl. ............... 340/12.22; 340/12.15; 340/13.24; 341/176; 446/458

(58) Field of Classification Search ................. 340/3.22, 340/12.22, 12.51, 12.55, 561, 562, 565, 686.1, 340/686.6, 539.11, 539.23, 689; 715/865; 446/460, 164, 325, 326, 135, 136; 341/176, 341/32
See application file for complete search history.

(56) References Cited

U.S. PATENT DOCUMENTS 6,611,252 B1 8/2003 DuFaux
6,798,401 B2 9/2004 DuFaux
6,856,239 B1 * 2/2005 Hicks ............................ 340/5.7
7,834,850 B2 * 11/2010 Boillot et al. ................ 345/158
2002/0006807 A1 1/2002 Mantyjarvi et al.
2002/0061217 A1 5/2002 Hillman et al.
2003/0193479 A1 10/2003 DuFaux
2004/0046744 A1 3/2004 Rafii et al.
2005/0088416 A1 4/2005 Hollingsworth
2008/0048878 A1 * 2/2008 Boillot ...................... 340/686.1
2008/0088580 A1 4/2008 Poupyrev et al.
2009/0189769 A1 * 7/2009 Schaffler et al. ........... 340/572.7
2009/0318069 A1 * 12/2009 Konet .......................... 454/155

FOREIGN PATENT DOCUMENTS

WO WO 03/044287 A2 5/2003

OTHER PUBLICATIONS

International Preliminary Report on Patentability dated Nov. 8, 2010 issued in corresponding PCT application No. PCT/US2009/043584, 12 pages.
International Search Report dated Oct. 29, 2009 issued in corresponding PCT application No. PCT/US2009/043584, 12 pages.

* cited by examiner

*Primary Examiner* — Daniel Wu
*Assistant Examiner* — Frederick Ott
(74) *Attorney, Agent, or Firm* — Snyder, Clark, Lesch & Chung, LLP

(57) ABSTRACT

A method and a system are provided for controlling a controller without physically touching the controller. A hand or other object interacts with a field surrounding the controller, altering the field. A change in characteristic of the altered field causes a corresponding movement of the controller that, in turn, corresponds to an amount of change in a parameter of a target device being controlled by the controller. The parameter of the target device is controlled by the controller while a user has no physical contact with the controller.

25 Claims, 7 Drawing Sheets

TOUCHLESS CONTROL OF A CONTROL DEVICE

TECHNICAL FIELD

The present invention is directed to the control of a controller, and, more particularly, to a touchless control thereof.

BACKGROUND

Controllers such as, for example, remote controls for televisions, radios, garage door openers, etc. are well known. These devices provide the convenience of a handheld controller that is capable of increased functionality. The focus of these controllers is to control a target device remotely so as, for example, to offer convenience for a user, enabling a user to control the functionalities of the target device. Such functionalities may include, but are not limited to, volume control, on/off, open/close, channel selection, brightness control, etc. To further these objectives, various devices have been developed.

A disadvantage of known devices is that these remote controllers must be physically handled by a user. In certain environments, such as hospitals or anywhere where germs or contamination is a concern, it is not desirable for a remote controller to be physically handled. There are known remote controllers that control certain functionalities of a target device without physical contact with the remote controller, but there must be some physical contact with the remote controller in order to control other functionalities of the target device.

Accordingly, it would be desirable to have a completely touchless remote controller.

SUMMARY OF THE DISCLOSURE

A completely touchless target object, such as a remote controller, is provided, wherein the control of all functionalities of a target device, controlled by the target object, is performed without touching the physical target object, e.g., a remote controller.

In a preferred embodiment, capacitive sensors are used to determine the relative position of a user's hand, or other implement, such as a stylus, pencil, rod, etc., in order to move, or react with, a target object in a "digital telekinesic" manner.

In another preferred embodiment, light sensors, such as lasers or infrared sensors, for example, may be used to determine the relative position of an object, such as a user's hand, or other implement, in order to move or react with the target object.

The use of capacitive sensors is preferable when there is a small gap between the sensor and the target object, since capacitive effects are reduced when the implement and the target object are further apart. However, the use of light sensors is preferable when the distance between the implement and the target object is large since light sensors will be operative at greater distances than capacitive sensors.

In still another preferred embodiment, Near Field Communication (NFC) technology is employed in order to determine the relative position of an object, such as a user's hand, or other implement, in order to move or react with the target object. The use of NFC technology may add a level of security to the operation of the target object. NFC technology relies on an NFC reader and an NFC source capable of being programmed to respond only to certain signals. For example, a user may employ his/her hand as the implement to be brought into the field, similar to the capacitive sensor embodiment, but the user might wear a ring on his/her finger, wherein the ring may contain an NFC reader thereon. Accordingly, unless a user bore a ring having an appropriate NFC reader, the user could not control the target object. It will be understood by artisans that, in such an embodiment, the NFC reader may be on the target object and the ring may comprise the NFC source, or vice-versa. As will be understood by artisans, such an NFC source or reader may be employed on objects other than finger rings, e.g., NFC devices may be attached to keys, cards, etc.

In yet another preferred embodiment, NFC technology may be used in conjunction with any of the other technologies, e.g., capacitive sensors, to provide an additional layer of security.

In accordance with the present disclosure, a controller may be touchlessly controlled to control any parameter of a target device in an analog manner, where the parameter has a value from zero up to a maximum value. Examples may include controlling the volume on a television receiver or stereo set, opening/closing a garage door, controlling the position of a lever, or opening and closing a gate or a door.

The completely touchless control of a controller is achieved by causing a change in a generated field surrounding or proximate to the controller so as to change an orientation of the housing of the controller in a manner to control an analog parameter related to a target device to be controlled by the controller. Thus, with no physical contact with the controller, a generated field proximate the controller is altered, and a change in characteristic of the altered field causes the controller to move in response to that change in characteristic.

In still another preferred embodiment, the movement of the controller is effected by a motive device, such as a motor, connected to a drive shaft, and in conjunction with a track having a support member for supporting a counterbalance mechanism.

In yet still another preferred embodiment, the housing of the controller comprises a motion/orientation sensor, such as an accelerometer, a gimbal, or a gyroscope, in order to provide the controller with information relative to the orientation of the controller housing.

In a further preferred embodiments, once the desired value of the parameter of the target device is reached by moving the controller to a desired position/orientation via a longitudinal movement of a hand or other implement into/out of a field, the parameter value may be set by movement of the hand or other implement in a lateral manner out of the field.

In still a further preferred embodiment, the setting of the parameter value is achieved through the use of two capacitive sensors, one on each side of the controller, so as to cause movement of the controller in only a single direction when interacting with the field corresponding to the first sensor, and to cause movement of the controller in the opposite direction when interacting with the field corresponding to the second sensor.

In yet still another preferred embodiment, once the desired value of the parameter of the target device is reached by moving the controller to a desired position/orientation via a longitudinal movement of a hand or other implement into/out of a field, the parameter value may be set by quickly moving of the hand or other implement out of the field in any direction, using a slow-responsive damping element in conjunction with a servo-motor.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive

BRIEF DESCRIPTION OF THE DRAWINGS

FIG. 1(*a*) is a perspective view of an embodiment of a controller configured to orient itself in accordance with a force applied touchlessly against the controller. FIG. 1(*b*) is a transverse, cross-sectional view of the controller of FIG. 1(*a*) shown in a rest position/orientation. FIG. 1(*c*) is a transverse, cross-sectional view of the controller of FIG. 1(*a*) shown in a second position/orientation. FIG. 1(*d*) is a transverse, cross-sectional view of the controller of FIG. 1(*a*) shown in a third position/orientation.

DESCRIPTION OF THE PREFERRED EMBODIMENTS

Figure 1A:
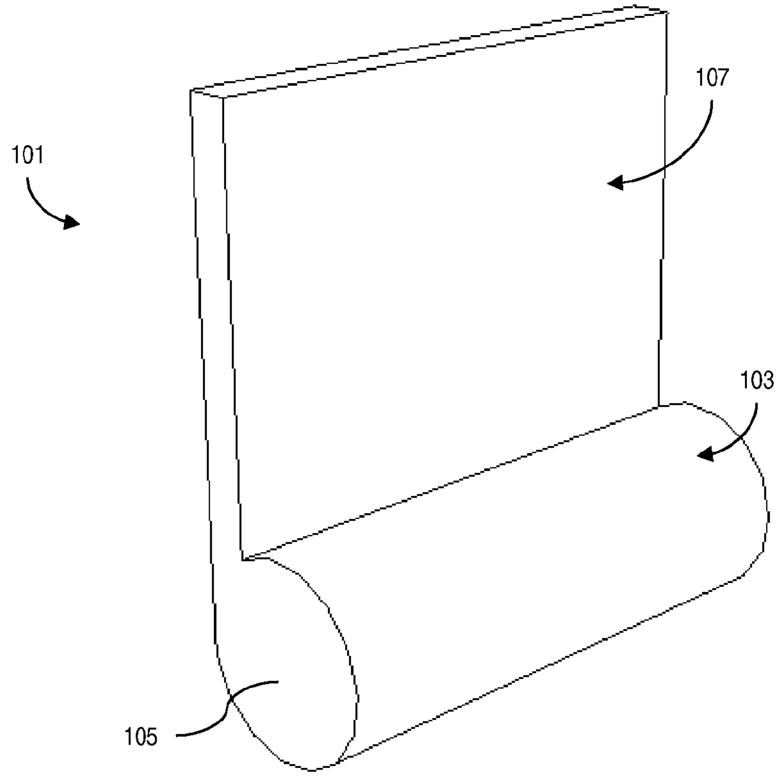
FIG. 1 comprises FIGS. 1(*a*) through 1(*d*).
Figure 1B:
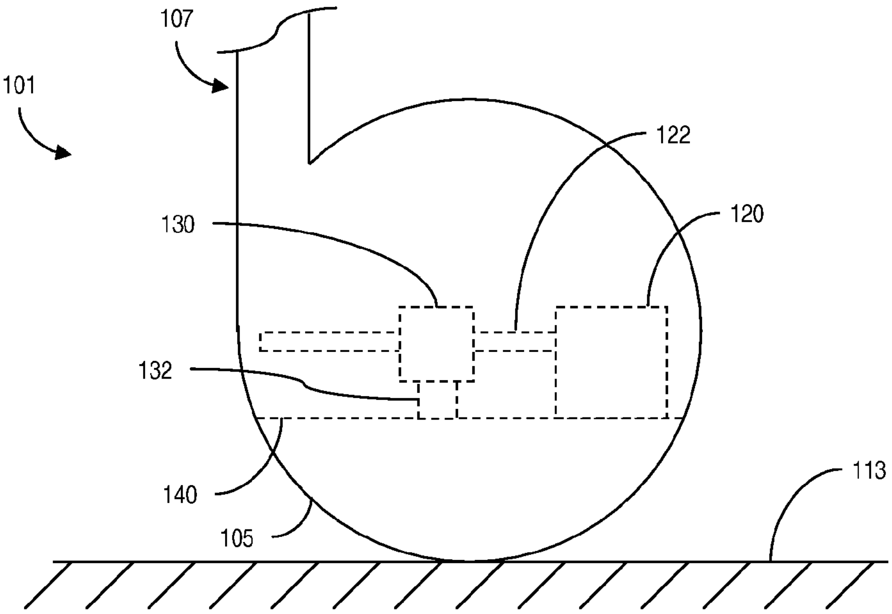
Figure 1C:
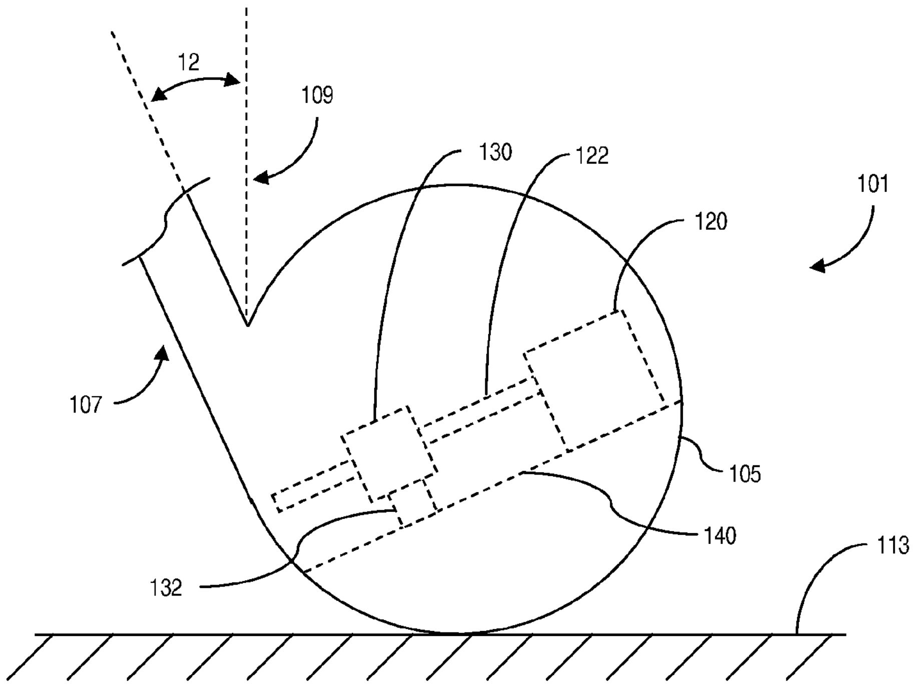
Figure 1D:
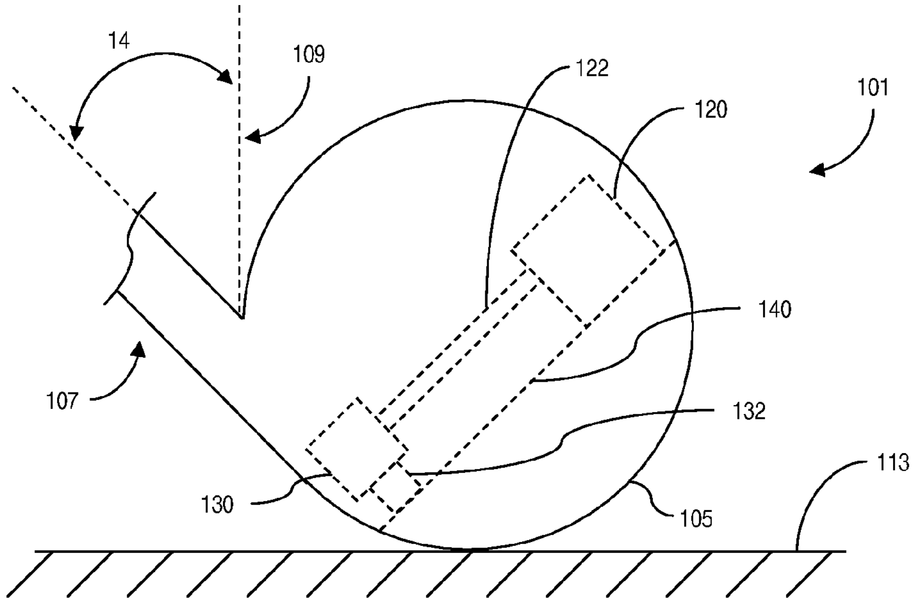

Embodiments of the present invention will be described hereinafter with reference to the accompanying drawings. In the following description, the constituent elements having substantially the same function and arrangement are denoted by the same reference numerals, and repetitive descriptions will be made only when necessary.

With reference to FIG. 1, a remote controller 101 is depicted in FIG. 1(*a*).

Remote controller 101 has a cylindrically-shaped housing 103, that includes a support surface 105, and a substantially vertical portion 107 projecting from the housing 103 in a direction substantially perpendicular to the longitudinal direction of the cylindrical housing 103. While portion 107 is depicted as substantially rectangular and housing 103 is depicted as cylindrical in this embodiment, it should be understood that these portions of controller 101 may take on various shapes so long as the support surface 105 is capable of some motion relative to a supporting surface on which it sits. For example, support surface 105 may be a curved surface in the shape of a half cylinder; or could be curved in any alternative configuration such as spherical, oval, or any symmetrical or non-symmetrical curved surface (e.g., when viewed along one or more of a transverse cross-section (see FIG. 1(*b*)) or a longitudinal cross-section, the curved support surface can be spherical, semi-circular, semi-elliptical, semi-oval, parabolic, etc.). The support surface 105 is a surface of the housing 103 upon which the remote controller 101 is typically rested when the remote controller 101 is placed upon a supporting surface, such as a planar supportive surface 113 shown in FIG. 1(*b*). The shape of the support surface 105 of controller 101 is such that it is capable of a rocking, rolling, or pivoting motion relative to an imaginary axis when the housing 103 is supported by a supporting surface 113 and a force is applied to the housing 103 (e.g., a force that changes a center of gravity of the controller 101 or a force that is applied to the controller 101 at an offset location from the center of gravity of the controller 101. In the rest position depicted in FIG. 1(*b*), the vertical portion 107 is coplanar with a vertical plane.

FIG. 1(*c*) depicts a second position/orientation, where the vertical portion 107 is tilted to an angle 12 with respect a vertical plane 109. Furthermore, FIG. 1(*d*) depicts a third position/orientation, where the vertical portion 107 is tilted to an angle 14 with respect to a vertical plane 109.

The orientation of controller 101 is indicative of a changed parameter in the target device being controlled by the controller. For example, in an embodiment where the target device being controlled by the controller 101 is a television receiver, and the parameter being controlled is the volume of the television receiver, the position/orientation of controller 101, where the vertical portion 107 is tilted to an angle 14 with respect to a vertical plane 109, as indicated in FIG. 1(*d*), where angle 14 is greater than angle 12 in FIG. 1(*c*), indicates that the volume of the television receiver is greater in the position/orientation depicted in FIG. 1(*d*) than in the position/orientation depicted in FIG. 1(*c*).

Accordingly, FIG. 1(*b*) depicts a default or rest position/orientation of the controller 101 provided on a supporting surface 113, where the vertical portion 107 of the controller is generally vertical and perpendicular to the supporting surface 113. Thus, the controller 101 can be constructed in a manner such that the depiction in FIG. 1(*b*) is a typical rest position, where the housing 103 is rested upon the planar supporting surface 113 and the controller 101 is generally balanced on a center of the curved support surface 105 with a vertical portion 107 being in a generally vertical configuration. Of course, the controller 101 can be constructed to have some other rest position, for example, the position shown in FIG. 1(*c*) or FIG. 1(*d*), etc.; however, for the ease of description, the depiction in FIG. 1(*b*) will be considered the rest position in this embodiment. Thus, in the rest position, such an orientation will indicate to a user that the parameter (e.g., volume) of the target device being controlled by controller 101 is at a default level. The default level may be any level from zero up to a maximum value.

The controller 101 includes a motive device that is configured to move a weight, or counterbalanced mechanism, housed within housing 103 in response to a change in a field surrounding or proximate to the controller 101 as will be described in greater detail below, in order to cause the curved support surface of the housing to roll on the surface 113 supporting the controller 101. The motive device, weight, and curved support surface can be formed in many different configurations in order to provide the controller with many different movement configurations using many different structures. For example, the weight can be a battery of the controller 101 or any other weighted component thereof, a fluid material, ball bearings, etc., and the motive device used to move the weight can be any variation of motor, pump/value configuration (e.g., to move a fluid material), magnetic or electromagnetic device, etc.

In the embodiment depicted in FIGS. 1(*b*)-1(*d*), the controller 101 includes an electric motor 120 as the motive device, and a weight 130, such as the battery of the controller 101. The weight 130 of the controller 101 is supported on a track 140 using a support member 132 that is slidably received by the track 140 along transverse directions as shown in FIGS. 1(*b*)-1(*d*). Such a track can incorporate ball-bearings in order to reduce friction. The electric motor 120 is connected to a drive shaft 122 that the electric motor can drive in rotation in a clockwise and counterclockwise direction about an axis of the drive shaft 122. The weight 130 is connected to the drive shaft 122 and the rotation of the drive shaft 122 moves the weight 130 along the track 140. For example, the drive shaft 122 can be threaded and threadedly engaged to a threaded hole on the weight 130, such that, for example, clockwise rotation of the drive shaft 122 drives the weight 130 to the right in FIG. 1(*b*) and counterclockwise rotation of the drive shaft 122 drives the weight 130 to the left in FIG. 1(*b*). This configuration can be used to change the center of gravity of the controller 101, thus causing the housing 103 to roll along the curved support surface 105 on the supporting surface 113.

In order to achieve the movement from the rest position/orientation depicted in FIG. 1(*b*) to the second position/orientation depicted in FIG. 1(*c*), the motor 120 rotates the drive shaft 122 to move the weight 130 along track 140 in a leftward direction, thereby shifting the center of gravity of the controller 101 leftward and causing the housing 103 to roll leftward along the curved support surface 105. Similarly, in order to achieve the movement from the second position/orientation depicted in FIG. 1(*c*) to the third position/orientation depicted in FIG. 1(*d*), the motor 120 further rotates the drive shaft 122 to move the weight 130 along track 140 in a leftward direction. Once the event causing this movement (e.g., interaction of a hand with a field depicted in FIG. 2 below) is acted upon and the event is no longer present (e.g., the hand is withdrawn longitudinally from the field), the motor 120 can reverse the direction of rotation of the drive shaft 122 to return the weight 130 rightward to the position in FIG. 1(*b*), thus returning the controller 101 to the rest position/orientation. As will be explained below, with regard to FIG. 2, if a user desires to maintain the position of the controller 101 once the implement, e.g., a hand, is withdrawn from the field, the implement will be withdrawn in a lateral direction, thus preserving the position/orientation of controller 101.

While the mechanism for moving the controller 101 has been described in a preferred embodiment employing a weight 130 moving along a track responsive to a motor 120 moving a drive shaft 122, other arrangements for shifting the center of gravity of the controller 101 are possible. For example, although not shown, a first gear mechanism attached to the body of the controller 101, e.g., within the housing 103, may mesh gears with a second gear mechanism attached to the weighted body 130, whereby rotation (as by movement caused by a field change, described with reference to FIG. 2, below) of the first gear mechanism moves the weighted body 130 along a specified path, shifting the center of gravity of the controller 101.

Figure 2:
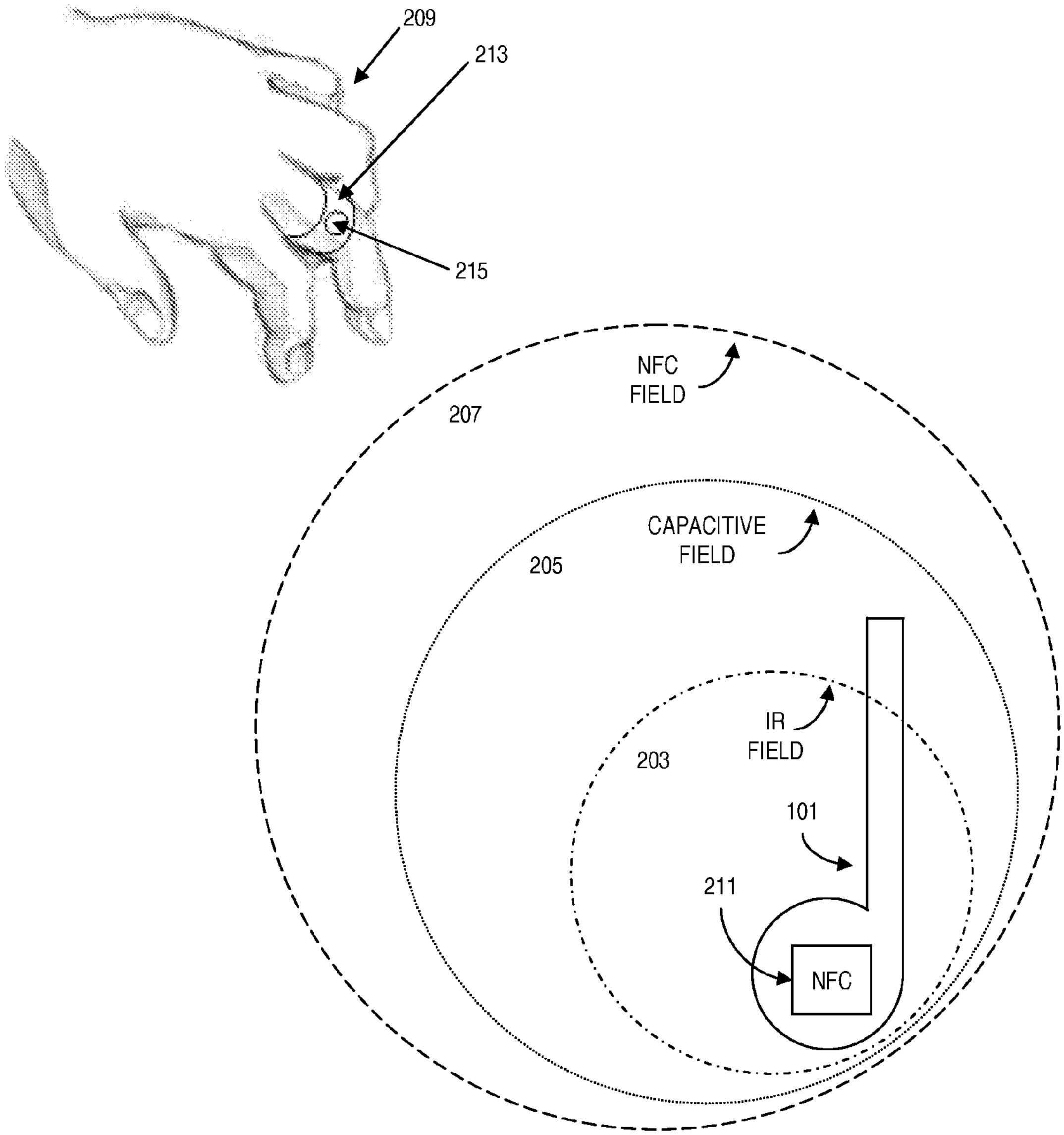
FIG. 2 is a diagram of the interaction of an implement with a field generated around or proximate to the controller.

FIG. 2 illustrates a system 200 for controlling a remote controller in a touchless manner, using the remote controller 101 of FIG. 1(*a*) as exemplary. It is to be understood, however, that any other appropriately shaped remote controller, may also be employed in system 200, in place of remote controller 101.

A hand 209, or any other appropriate implement including, but not limited to, a pen, a ring, a card, a stylus, etc., is brought near the target object, viz. remote controller 101. As the hand nears the remote controller 101, it contacts a field around remote controller 101. That field may comprise, for example, an infrared field 203, a capacitive field 205, and/or a NFC field 207. There may be only a single field or there may be a combination of fields. The fields are established in accordance with the types of sensors employed. For example, if NFC technology is employed, either one of the remote controller 101 and the hand 209 or other implement, would have a NFC source and the other of the two would comprise a NFC reader, or vice-versa. An example is depicted in FIG. 2, wherein the remote controller 101 comprises, either thereon, or therein, a NFC reader 211, while hand 209 bears a ring 213 thereon, the ring 213 having embedded therein or thereon a NFC source 215. Alternatively, the NFC reader may be on/in the ring 213 on hand 209 and the NFC source may be on/in the remote controller 101. It is also understood that the NFC source/reader may be on/in a card held in hand 209 or in a stylus, or a pen, or any other implement held by hand 209.

In a preferred embodiment, an empty hand 209 may merely interact with the remote controller 101 through a capacitive field 205, the level of capacitance varying with the distance of the hand 209 from the remote controller 101. In an exemplary embodiment, as the hand 209 moves closer to the remote controller 101, the increased capacitance would cause the remote controller 101 to move a greater amount in a rocking motion away from hand 209 that would, for example, increase the volume on an electronic target device controlled by the remote controller 101. That is, as the hand 209 approaches remote controller 101, the controller 101 rocks to a further extent away from the hand, increasing the volume, and as the hand pulls back from remote controller 101, the controller 101 rocks back towards the hand 209, reducing the volume. When the hand 209 is removed from the field in a lateral direction, i.e., perpendicular to the longitudinal direction of the hand to/from the controller 101, remote controller 101 remains in the last position attained at the point of removal because there is no change sensed in the field(s).

Of course, there are also other ways to maintain the remote controller in its last position in order to set the position/orientation of the controller, and thus, the desired value of the parameter of the target device. Besides the lateral movement of the object out of the field, as described above, while not shown in the drawings, motor 120 may be, for example, a servo-motor in conjunction with a slow-responsive damping mechanism so that a rapid withdrawal of the object 209 (as opposed to a slower, more deliberate entry of the object 209 into the field to effect movement of the controller to a desired position) would cause no further response from the controller 101, leaving controller 101 in its last position just prior to the rapid withdrawal of the object 209. Still a further embodiment for maintaining the remote controller 101 in a desired position is explained below with reference to FIGS. 5(*a*) and 5(*b*).

There are many scenarios that may be employed to generate and sense fields. A hand, alone, may be used to control the remote controller by interacting with a field, such as a capacitive field. A hand bearing an NFC device, such as a security ring or card, may be used to control the remote controller by interacting with the NFC field alone or in combination with a capacitive field. Any object other than a hand, or a combination of any other object with a NFC device, or an object with an infrared emitter may be employed. Various combinations of sensors and types of fields may be employed without departing from the scope of the disclosure. It is important only that a sensor field of any type is altered and that altered field causes some outcome. Exemplary outcomes comprise controlling the volume control on an audio device, moving an object, manipulating a lever, locking/unlocking a door or a gate, etc. but this disclosure should not be construed as being limited to any particular outcome.

Figure 3:
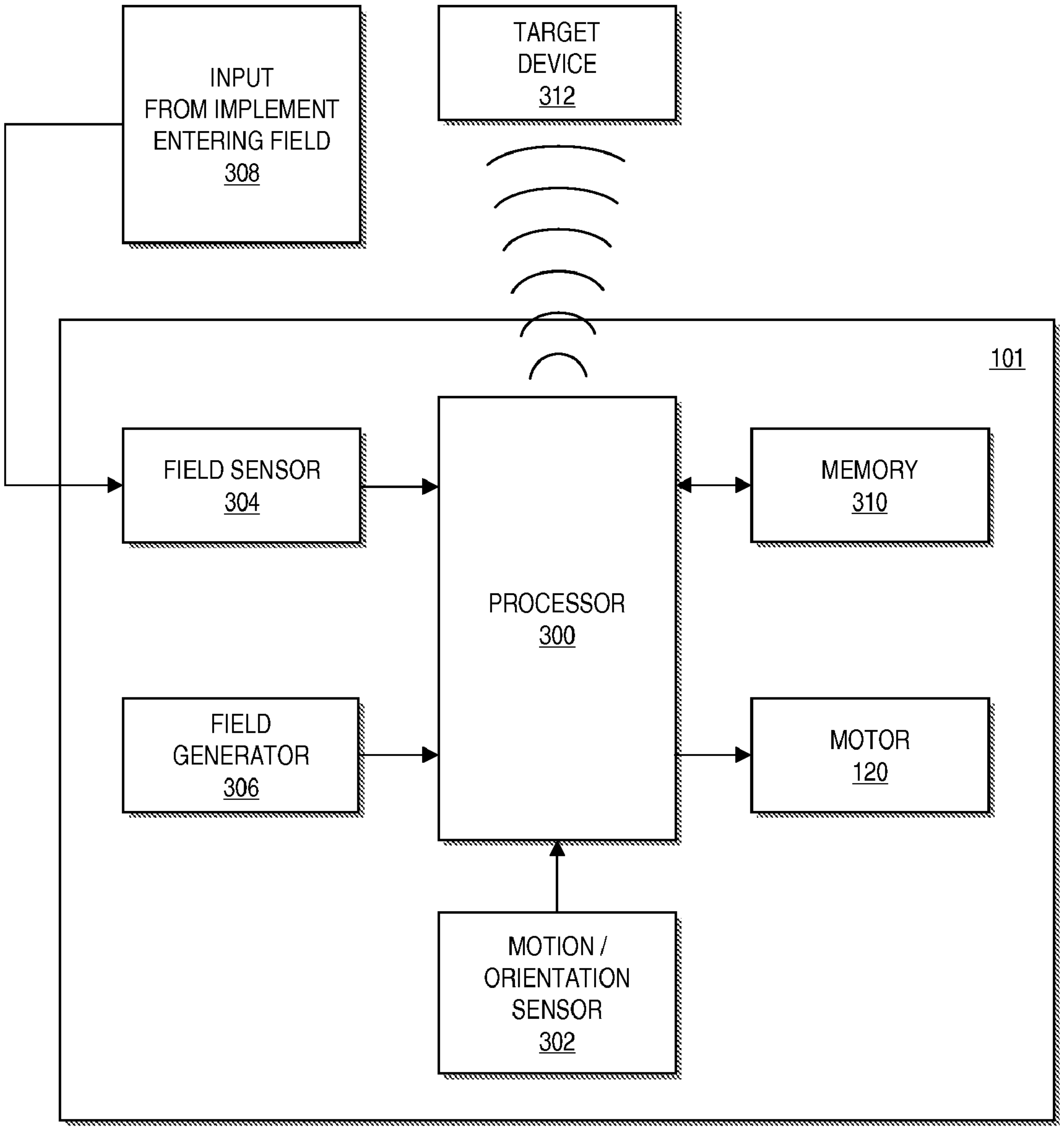
FIG. 3 is a block diagram of controller components used for implementing the embodiment of the controller illustrated in FIGS. 1(*a*)-1(*d*).

FIG. 3 is a block diagram of controller components used for implementing the embodiment of the controller 101 illustrated in FIGS. 1(*a*)-1(*d*). A processor 300 is coupled to a memory 310, as in any well-known remote controller configuration, for example. An appropriate field, or fields is/are generated by field generator 306. This might include, for example, a NFC source for generating a NFC field with which a NFC reader will interact when brought close enough to the generated field. However, the generated field may comprise a capacitive field and/or an infrared field, each generated in a well known manner. A hand, or other implement, entered into, or sufficiently near, the field generated by field generator 306, will cause an input signal to be generated, as depicted at 308 in FIG. 3. This generated input signal will be sensed by field sensor 304 and field sensor 304 will generate an output indicative of a change in field event. The output from the field sensor 304 and the output from field generator 306 are both input to a processor 300. The processor computes, from these two output signals, the degree of change in the surrounding field and maps this degree of change to a corresponding required movement of the controller 101.

The field sensor 304 may comprise sensors 403, 405, and/or 407, illustrated in FIG. 4 below, for sensing that the field has changed. The field sensor 304 then sends a signal to processor 300 indicative of the coordinates of an intruding object such as 209. The processor 300 then processes these coordinates, indicative of the changing position and direction of movement of the object 209, and processor 300 uses this processed data, along with data about the field, from field generator 306, to send a signal to a motive means, such as motor 120, instructing the motor 120 as to how far and in which direction to move weight 130 along the driveshaft 122 so as to effect the change in center of gravity required to orient the controller 101 into a position corresponding to the field change.

The processor 300 is also coupled to a motion/orientation sensor, or detector, 302. The motion/orientation sensor 302 is configured to sense the motion of the controller 101 (as motor 120 follows the commands from processor 300 to change the center of gravity of controller 101 in a manner described above), and is preferably configured to sense the orientation of the controller 101 at any given instant. For example, the motion/orientation detector 302 can include one or more of an angular and/or linear accelerometer, a gimbal, a gyroscope, or any other device capable of performing such functions. The motion/orientation sensor 302 senses a current position/orientation of the controller 101 and sends this information to processor 300. Processor 300 then uses this orientation information to calculate a value of a parameter corresponding to orientation of the controller 101. While the parameter could be any analog function value, e.g., brightness, color adjustment, etc., that can be adjusted from a zero value to a maximum value, in the example employed herein, the parameter is the volume of a target device, e.g., a television receiver. In this example, the processor 300 would determine a value of the volume corresponding to the position of controller 101 as indicated by motion/orientation sensor 302 (this could be determined, for example, with the use of a look-up table in memory 310) and from that determined corresponding volume value, send a signal wirelessly to target device 312 in a conventional manner for controlling the volume thereof.

Thus, for example, as remote controller 101 rocks away from object 209, the volume of the target device 312, such as a television receiver, may increase, while bringing object 209 back towards its original position causes remote controller 101 to rock in a direction towards object 209, reducing the volume of the target device. When it is desired to rock the remote controller 101 to a particular position, setting a particular volume value (or some other parameter value), the object 209 is moved to a position that causes the remote controller 101 to rock to the position corresponding to the desired volume level, and then the object 209 is removed from the field in a lateral manner.

Figure 4:
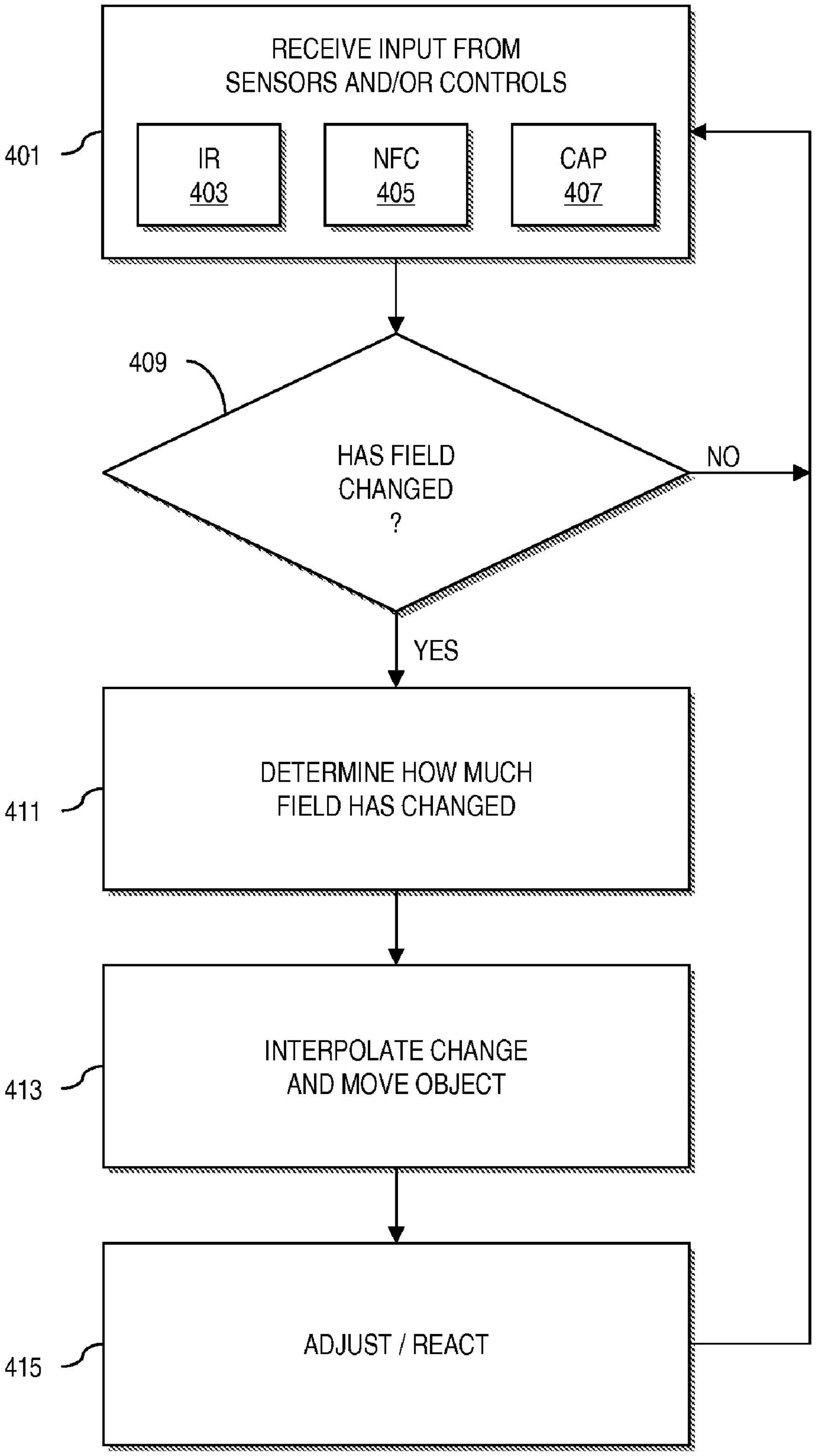
FIG. 4 is a flowchart illustrating the operation of the touchless system for controlling the controller.

Referring to FIG. 4, a flowchart 400 illustrates the operation of the touchless system for controlling a target object, e.g., a remote controller. At sensor/control block 401, a field is generated around the controller and sensors are established for sensing the field. These sensors may comprise an infrared sensor 403, a NFC sensor 405, a capacitive sensor 407, or any other sensor, or combination of sensors, compatible and appropriate for sensing the type of field generated around the controller.

The field is continuously monitored at decision block 409 in order to determine if there has been any change in the field. If there has been no change in the field, then the process returns to the sensor/control block 401. If there has been a change in the field, the process continues to block 411 where a determination is made as to the degree of change in the field. Then, at block 413, with the amount, or degree, of change in the field known, the change is interpreted and a reaction is generated by moving the controller in some manner proportional to, or in accordance with, the degree of change in the field. A parameter of the target device being controlled by the controller is then adjusted accordingly at block 415. For example, the device being controlled, i.e., the target device, may be a television receiver and the parameter being controlled may be the volume of the television receiver. The process then returns to the sensor/control box 401 to begin the process anew.

A preferred manner of interpreting a change in the field and causing an appropriate reaction by the remote controller in movement involves the establishment of a three-dimensional grid within the field surrounding the remote controller. As a hand, or other object, approaches the remote controller 101, the position of the portion of the hand or other object closest to the remote controller 101 is sensed as having particular x, y, and z coordinates. As the hand or other object continues to approach the remote controller 101, the coordinates of the closest portion of the hand or other object change and this change in coordinates permits processor 300 to process this data and to send a signal to the moving mechanism (e.g., motor 120) to move the remote controller 101 an appropriate amount and in the appropriate direction commensurate with the position of the hand or other object 209 within the field.

Figure 5A:
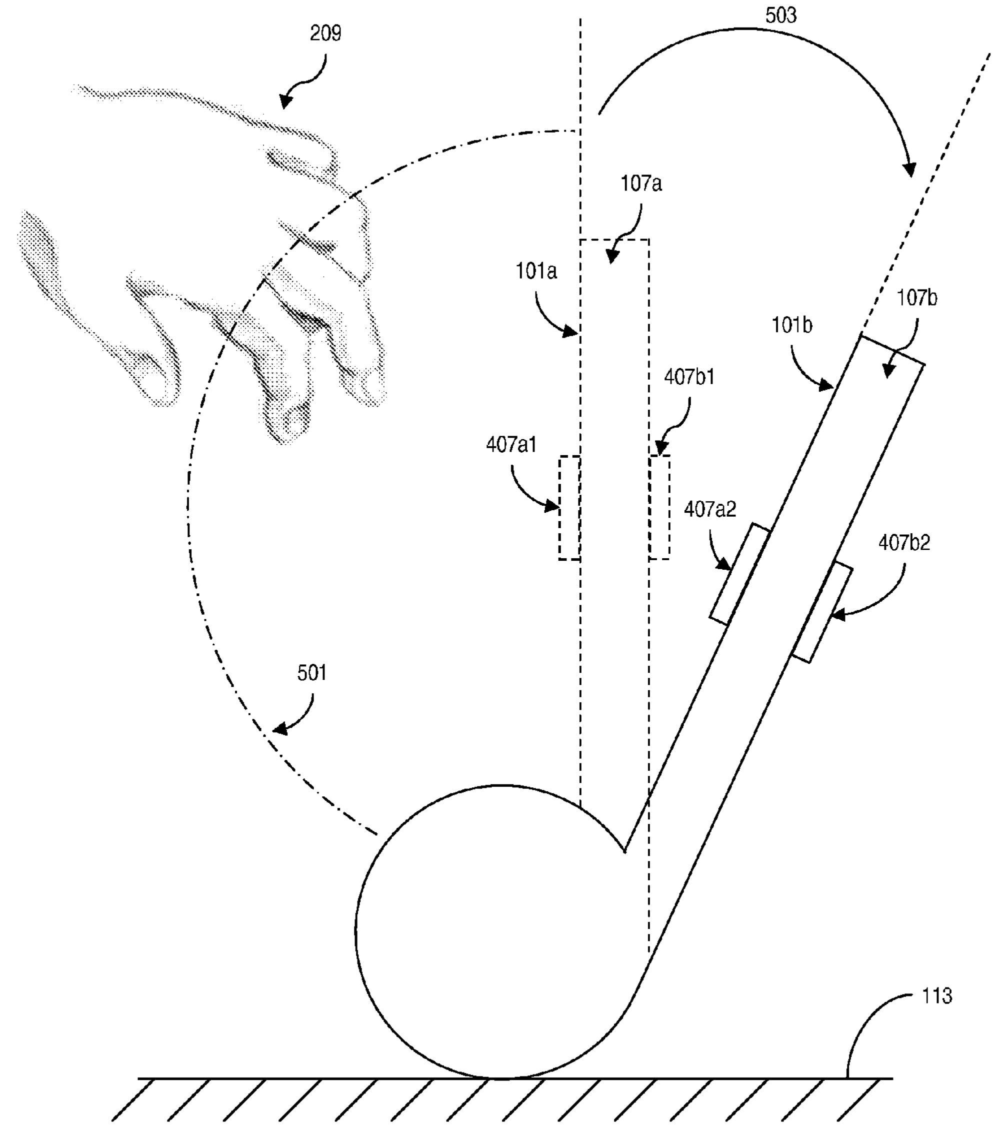
FIG. 5 comprises FIG. 5(*a*) and FIG. 5(*b*) which depict a preferred embodiment wherein separate sensors, one on each side of the controller, cause the controller to move in opposite directions, especially useful for setting the controller to a desired, fix position.
Figure 5B:
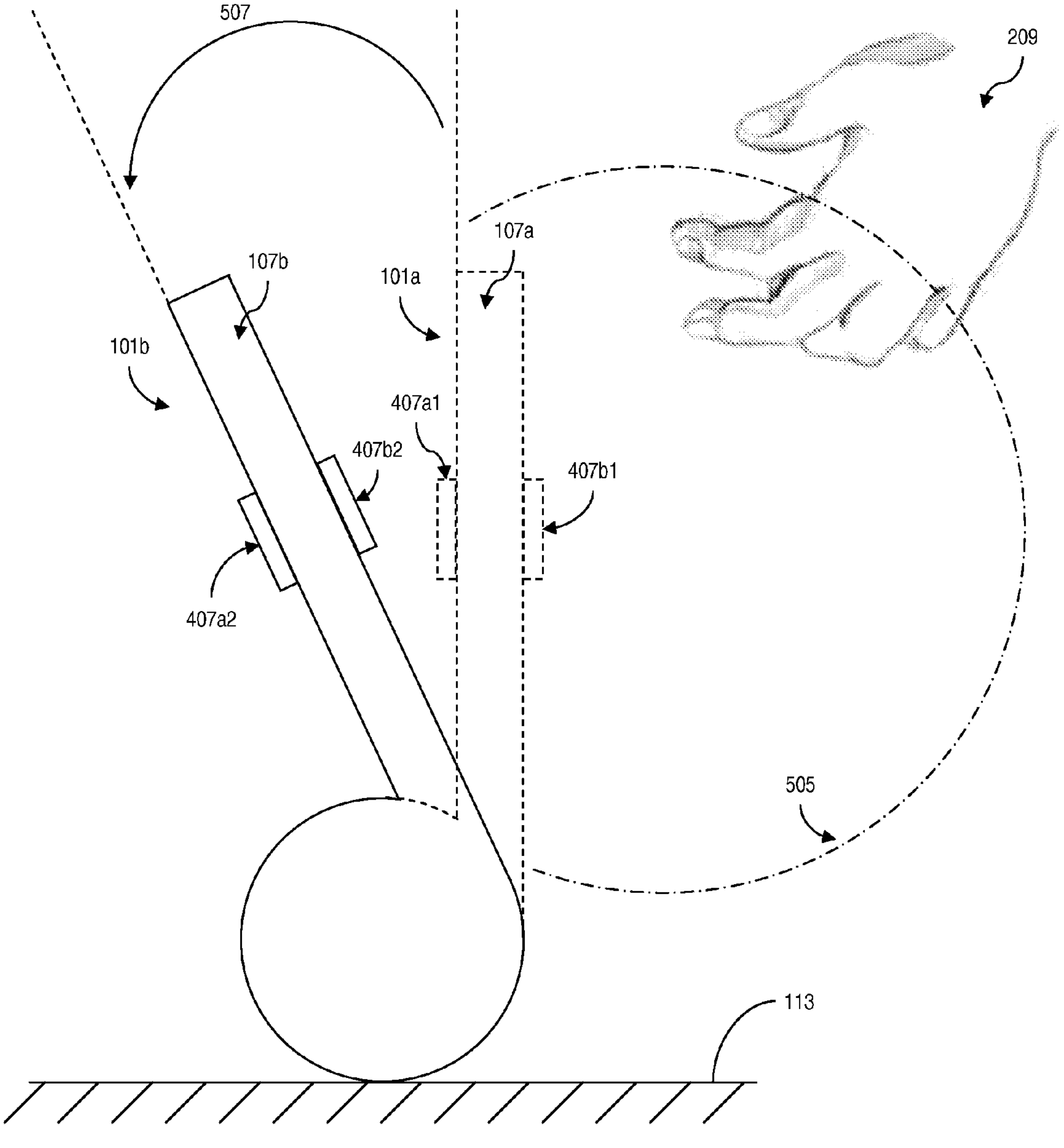

FIGS. 5(*a*) and 5(*b*) are illustrations depicting a preferred embodiment for more finely tuning the ability of a user to set a desired position/orientation of the controller 101, that, in turn, will set the parameter of the target device 312 to the desired value.

FIG. 5(*a*) depicts controller 101, with vertical portion 107, in an at rest position, wherein the controller in this position is labeled 101*a*, having a vertical portion 107*a*. The at-rest position is depicted in broken-line format. The at-rest controller 101*a* has two capacitive sensors, one sensor 407*a*1 located on the front of vertical portion 107*a*, and the other capacitive sensor 407*b*1 located on the rear of vertical portion 107*a*. It is noted that while the capacitive sensors 407 are depicted as being on the outside front and rear surfaces of portion 107, for ease of illustration, it is to be understood that these capacitive sensors 407 may just as well be located on the inside of portion 107 of controller 101. The capacitive sensors may be located on the inside front and rear surfaces of portion 107, or they may be located anywhere inside (or outside) the housing 103 of controller 101. The only limitation on locating the sensors is that they must be capable of sensing an intrusion by an object into a field within its jurisdiction and must be incapable of sensing an intrusion of an object into a field not within its jurisdiction, as will now be explained.

Continuing with the explanation of FIG. 5(*a*), a field 501 (a capacitive field, in this example) is generated. A change in characteristic of field 501 is caused by intrusion of an object, such as hand 209, into field 501. This change is sensed by capacitive sensor 407*a*1, but it is not sensed by capacitive sensor 407*b*1 on the opposite side of portion 107. Thus, field 501 corresponds to capacitive sensor 407*a*1. That is, field 501 is in the sole jurisdiction of capacitive sensor 407*a*1. Because of the relatively small range of capacitive fields, it is a simple matter to arrange the system so that capacitive sensor 407*a*1 will be responsive to a change in field 501 while capacitive sensor 407*b*1 will not be responsive to a change in field 501. Moreover, when the capacitive sensors 407*a*1 and 407*b*1 are located on the exterior of portion 107, portion 107 may be made of a material tending to shield capacitive sensor 407*b*1 from sensing any change in field 501 and to shield capacitive sensor 407*a*1 from field 505. When the sensors are located on the interior of the housing 103 of controller 101, e.g., on the interior of portion 107, there may be sufficient shielding applied, or distance between the sensors, such that the sensors 407*a*1 and 407*b*1 do not interfere with one another.

Thus, when an object, such as hand 209, approaches controller 101*a*, and interacts with field 501, sensor 407*a*1 senses this change in field 501 and, in accordance with the explanation above regarding movement of the controller housing, controller 101*a* tilts or rotates to the right, at an angle 503, away from the hand 209. The controller 101*b* in this new position, having a vertical portion 107*b* and capacitive sensors 407*a*2 and 407*b*2, remains in this position/orientation, i.e., at angle 503 from the vertical, unless and until the hand 209 moves closer to controller 101*b*. But if a user desires to maintain the controller 101*b* in this position (thus maintaining a desired parameter value in the target device, as explained above), the user merely removes his/her hand 209 from the field, in any direction, so long as the direction does not involve interacting with the rear of controller 101*b*.

Position maintenance is possible because capacitive sensor 407*a*1 is "unidirectional" in the sense that it is responsive to an increasing capacitance value but not to a decreasing capacitive value. That is, as the hand 209 approaches, the increased capacitance is sensed by sensor 407*a*1/407*a*2 and sensor 407*a*1/407*a*2 sends a signal indicative of this increased capacitance to processor 300 for processing in accordance with the disclosure above. Sensor 407*a*1/407*a*2 does not sense the hand 209 pulling away, because it sends no signal to processor 300 when capacitance value is decreasing. Such a function may be effected, for example, by sensing the direction of capacitance change (increasing or decreasing) and disconnecting the sensor (for example, breaking the connection between field sensor 304 and processor 300 in FIG. 3) when capacitance is decreasing, i.e., when the hand 209 is moving away from sensor 407*a*1.

When a user desires to move the controller housing, i.e., change the parameter value of the target device, in the opposite direction, the user's hand merely approaches the controller 101 from the opposite direction. Specifically, in FIG. 5*b*, a controller 101*a*, at the rest position, and comprising vertical portion 107*a*, and capacitive sensors 407*a*; and 407*b*1 is approached by hand 209. As the hand encroaches upon capacitive field 505, within the jurisdiction of capacitive sensor 407*b*1, but not within the jurisdiction of capacitive sensor 407*a*1, sensor 407*b*1 senses the change in the field 505 and sends an appropriate signal to processor 300 which, in accordance with the disclosure above, causes controller 101*a* to rotate or tilt to the left, by an angle 507 from the vertical. Controller 101*b*, comprising vertical portion 107*b*, and capacitive sensors 407*a*2 and 407*b*2, remains in this new position/orientation until and unless an object, e.g., hand 209, either moves further into field 505, e.g., closer to capacitive sensor 407*b*2, in which case controller 101*b* will rotate even further to the left, or moves to interact with field 501, within the jurisdiction of sensor 407*a*2, in which case controller 101*b* will rotate clockwise, i.e., in the opposite direction. This movement, i.e., rotation/orientation, of controller 101, as explained above, acts to control the value of a parameter, e.g., volume, of a target device, e.g., a television receiver.

As explained with regard to capacitive sensor 407*a*1/407*a*2, capacitive sensor 407*b*1/407*b*2 is also "unidirectional." Since each one of these sensors acts to control movement of the controller 101 in only a single direction, the stopping of the controller at a single position/orientation is a simple matter, resulting in an easy way of controlling the value of a parameter of a target device controlled by the controller and doing so in a completely touchless manner.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, while particular embodiments are described employing capacitive and NFC fields, an infrared field, or the like, could also be employed without departing from the scope of the invention. The specification and the drawings are accordingly to be regarded in an illustrative rather than restrictive sense.

What is claimed is:

1. A method, comprising:

generating a field proximate a remote controller, wherein the remote controller includes a housing having a curved support surface;

altering the field in the absence of contact with the controller;

determining a change in characteristic of the altered field; and using a motive device to move a weight within the housing along a linear track, in response to the change, to cause the curved support surface to roll on a surface supporting the remote controller.

2. The method of claim 1, wherein the altering comprises:

imposing an object into the field.

3. The method of claim 2, wherein the step of imposing comprises:

placing a user's hand in the vicinity of the controller in a defined relationship with respect to the structural configuration of the controller.

4. The method of claim 2, further comprising:

controlling at least one parameter of an electrical device in response to the rolling of the curved support surface of the remote controller on the surface supporting the remote controller.

5. The method of claim 4, wherein the electrical device comprises an audio system and the controlled parameter is volume.

6. The method of claim 1, wherein the weight is moved within the housing along the linear track by an amount related to a change in magnitude of a component of the field.

7. The method of claim 1, wherein generating the field comprises generating first and second non-overlapping fields;

wherein altering the field comprises selectively altering one or the other of the first and second fields; and wherein using the motive device to move the weight along the linear track in response to the change comprises:

moving the weight along the linear track, responsive to altering the first field, to cause the curved support surface to roll on the surface supporting the remote controller in a first direction; and moving the weight along the linear track, responsive to altering the second field, to cause the curved support surface to roll on the surface supporting the remote controller in a second direction that is different than the first direction.

8. The method of claim 1, wherein the field comprises a capacitive field.

9. The method of claim 1, wherein the field comprises a near field communication (NFC) field.

10. An apparatus, comprising:

a remote controller for remotely controlling a target electrical device, the remote controller embodied in a housing having a predefined structural configuration, the remote controller responsive to a spatial orientation of the housing to adjust a parameter of the target electrical device, the housing further comprising:

a processor;

a field sensor having an output coupled to an input of the processor; and a motive device mechanically coupled to the housing structure and electrically coupled to an output of the processor for moving a weight within the housing along a linear track to adjust the spatial orientation of the housing;

wherein the processor output is generated in accordance with the input received from the field sensor.

11. The apparatus of claim 10, wherein the housing further comprises a field generator configured to generate a field proximate and external to the housing.

12. The apparatus of claim 11, wherein the output of the field sensor is responsive to a change in the generated field resulting from intervention of an object within range of the field.

13. The apparatus of claim 12, wherein the object is a user's hand positioned in the vicinity of the controller in a defined relationship with respect to the structural configuration of the housing.

14. The apparatus of claim 13, wherein the field generator comprises a near field communication (NFC) generator and the field sensor is responsive to an NFC device held by the user's hand.

15. The apparatus of claim 13, wherein the field sensor comprises a capacitive field sensor.

16. The apparatus of claim 11, wherein the motive device comprises a motor and the motive device is responsive to the processor output to move the weight within the housing along the linear track to cause the housing to pivot about an axis by an amount related to a change in magnitude of a component of the field.

17. The apparatus of claim 16, wherein the motor is configured to move the weight from a first position along the linear track to one of a plurality of different second positions along the linear track, and wherein the different second positions correspond to different values of the parameter.

18. The apparatus of claim 16, wherein the weight comprises a battery electrically coupled to the remote controller.

19. The apparatus of claim 16, wherein the field sensor comprises first and second field sensors for selectively sensing, respectively, first and second non-overlapping fields; and the motive device moves the weight within the housing along the linear track to adjust the spatial orientation of the housing structure in a first direction responsive to altering the first field and moves the weight within the housing along the linear track to adjust the spatial orientation of the housing structure in a second direction responsive to altering the second field; and wherein the processor output is generated in accordance with the input received from a selected one of the first and second field sensors.

20. The apparatus of claim 10, wherein the parameter comprises audio volume.

21. A method, comprising:

generating a field proximate a remote controller;

altering the field in the absence of contact with the controller;

determining a change in a characteristic of the altered field; and moving the controller in response to the change, wherein generating the field comprises generating first and second non-overlapping fields, wherein altering the field comprises selectively altering one or the other of the first and second fields, and wherein moving the controller in response to the change comprises moving the controller in a first direction responsive to altering the first field and moving the controller in a second direction responsive to altering the second field.

22. An apparatus comprising:

a remote controller for an electrical device, the remote controller embodied in a housing having a predefined structural configuration, the remote controller responsive to the spatial orientation of the housing to adjust a parameter of the electrical device, the housing further comprising:

a processor;

a field sensor having an output coupled to an input of the processor; and a motive device mechanically coupled to the housing structure and electrically coupled to an output of the processor for adjusting the spatial orientation of the housing structure, wherein an output of the processor is generated in accordance with the input received from the field sensor, wherein the housing further comprises a field generator configured to generate a field proximate and external to the housing, wherein the motive device comprises a motor and a counterbalance mechanism, and wherein the motive device is responsive to the processor output to pivot the housing about an axis by an amount related to a change in magnitude of a component of the field.

23. The apparatus as recited in claim 22, wherein the motor is configured to move the counterbalance mechanism from a first position to one of a plurality of different second positions, and wherein the different second positions correspond to different values of the parameter.

24. The apparatus as recited in claim 22, wherein the counterbalance mechanism comprises a battery electrically coupled to the remote controller.

25. The apparatus as recited in claim 22, wherein the field sensor comprises first and second field sensors for selectively sensing, respectively, first and second non-overlapping fields, wherein the motive device adjusts the spatial orientation of the housing structure in a first direction responsive to altering the first field and adjusts the spatial orientation of the housing structure in a second direction responsive to altering the second field, and wherein the processor output is generated in accordance with the input received from a selected one of the first and second field sensors.

* * * * *